United States Patent [19]

Ishihara et al.

[11] Patent Number: 6,014,397
[45] Date of Patent: Jan. 11, 2000

[54] LASER CHAMBER INCORPORATING CERAMIC INSULATORS COATED WITH DIELECTRIC MATERIAL

[75] Inventors: Toshihiko Ishihara; Richard G. Morton, both of San Diego, Calif.

[73] Assignee: Cymer, Inc., San Diego, Calif.

[21] Appl. No.: 09/089,330

[22] Filed: Jun. 2, 1998

[51] Int. Cl.$^7$ ...................................................... H01S 3/22
[52] U.S. Cl. ................................ 372/57; 372/98; 372/33
[58] Field of Search ................................ 372/98, 33, 92, 372/57

[56] References Cited

U.S. PATENT DOCUMENTS

| | | | |
|---|---|---|---|
| 4,959,840 | 9/1990 | Akins et al. | 372/57 |
| 5,018,161 | 5/1991 | Akins et al. | 372/57 |
| 5,771,258 | 6/1998 | Morton et al. | 372/57 |

FOREIGN PATENT DOCUMENTS

| | | |
|---|---|---|
| 5-075182 | 3/1993 | Japan . |
| 6-169119 | 6/1994 | Japan . |

OTHER PUBLICATIONS

Pulker, H.K.,*Coatings on Glass*, Thin Films Science and Technology, 6, Tokyo, 1984; pp. Title Page, Table of Contents—pp. xiii–xviii, 203–207, 360–361.

*Primary Examiner*—Leon Scott, Jr.
*Attorney, Agent, or Firm*—Gary J. Edwards

[57] ABSTRACT

A coated ceramic insulator in a laser chamber that is exposed to a gaseous environment where impurities in the ceramic insulator are prevented from detrimentally contaminating the laser chamber by a high-purity insulating coating. The insulating coating prevents chemical interactions between the ceramic insulator and the gaseous environment. In particular, the coating prevents contamination, by impurities in the ceramic insulator, of the lasing gas.

7 Claims, 4 Drawing Sheets

LASER CHAMBER INCORPORATING CERAMIC INSULATORS COATED WITH DIELECTRIC MATERIAL

FIELD OF THE INVENTION

This invention relates to laser systems and, in particular, to insulators used in laser chambers.

BACKGROUND

Ceramic insulators are often used as electrical insulators in chemically and electrically hostile environments such as laser cavities. For example, the interior of a laser cavity typically contains several ceramic insulators. One such laser cavity is described in U.S. Pat. No. 4,959,840 to Akins et al., herein incorporated by reference in its entirety.

The ceramic insulators used in such cavities are typically formed from $Al_2O_3$, but other ceramics may also be used. Typical rare gas halides that are used as lasing gasses in excimer lasers include XeCl, KrCl, ArF, KrF, and XeF. The ceramics used as insulators within excimer laser are often contaminated with impurities. For example, the common ceramic $Al_2O_3$ is often contaminated with Si compounds ($SiO_2$ specifically). This does not affect the insulating qualities of the insulator, and, therefore, the laser designers have heretofore not recognized such contamination as a problem.

Applicants have recognized that, during use of the laser, the Si present on the surface of the ceramic insulator reacts with components of the lasing gas. In fluorine lasing gasses used with $Al_2O_3$ ceramics, $SiF_4$ is formed because of the impurities in the ceramic insulator. The $SiF_4$ absorbs a portions of the emission from the discharge area of the laser cavity, thereby causing the laser to be less efficient. The effects of this contamination are especially acute in ArF excimer lasers.

Others who have recognized this problem have attempted a solution that requires the application of a high purity ceramic insulator in the excimer laser. Japanese Pat. App. Publication No. 06-169119 and Japanese Pat. App. Publication No. 05-075182, for example, disclose this approach. However, a very high purity $Al_2O_3$ ceramic is required in order to minimize the contamination by $SiF_4$, which is a product of the $SiO_2$ and $F_2$ reaction. There is therefore a need for a solution which does not require the use such high-purity ceramic material, for economic and material availability reasons.

SUMMARY

According to the present invention, ceramic insulators in laser cavities are coated with a high purity coating insulator. With the coating, any contaminants in the substrate ceramic insulator are unable to react with the surrounding atmosphere. Coating an insulator used in the laser chamber has previously thought to be an unnecessary expense since the insulating properties of the insulators were unaffected by any contamination.

The coated ceramic insulator in a laser cavity prevents contamination of the lasing gas, preventing the degradation in the performance of the laser that may result from uncoated ceramic insulators.

In some embodiments, the ceramic insulator is $Al_2O_3$ and the coating is $MgF_2$. However, other ceramic insulators may be used and different insulator coatings may also be used. The choice of insulator coatings depends on the environment in which the coated insulator is to be used.

DETAILED DESCRIPTION

Ceramic insulators in a laser cavity, used for electrical insulation, are coated with a high-purity insulating film. The coating prevents impurities inherent in the ceramic insulators themselves from detrimentally contaminating the laser cavity.

Figure 1:
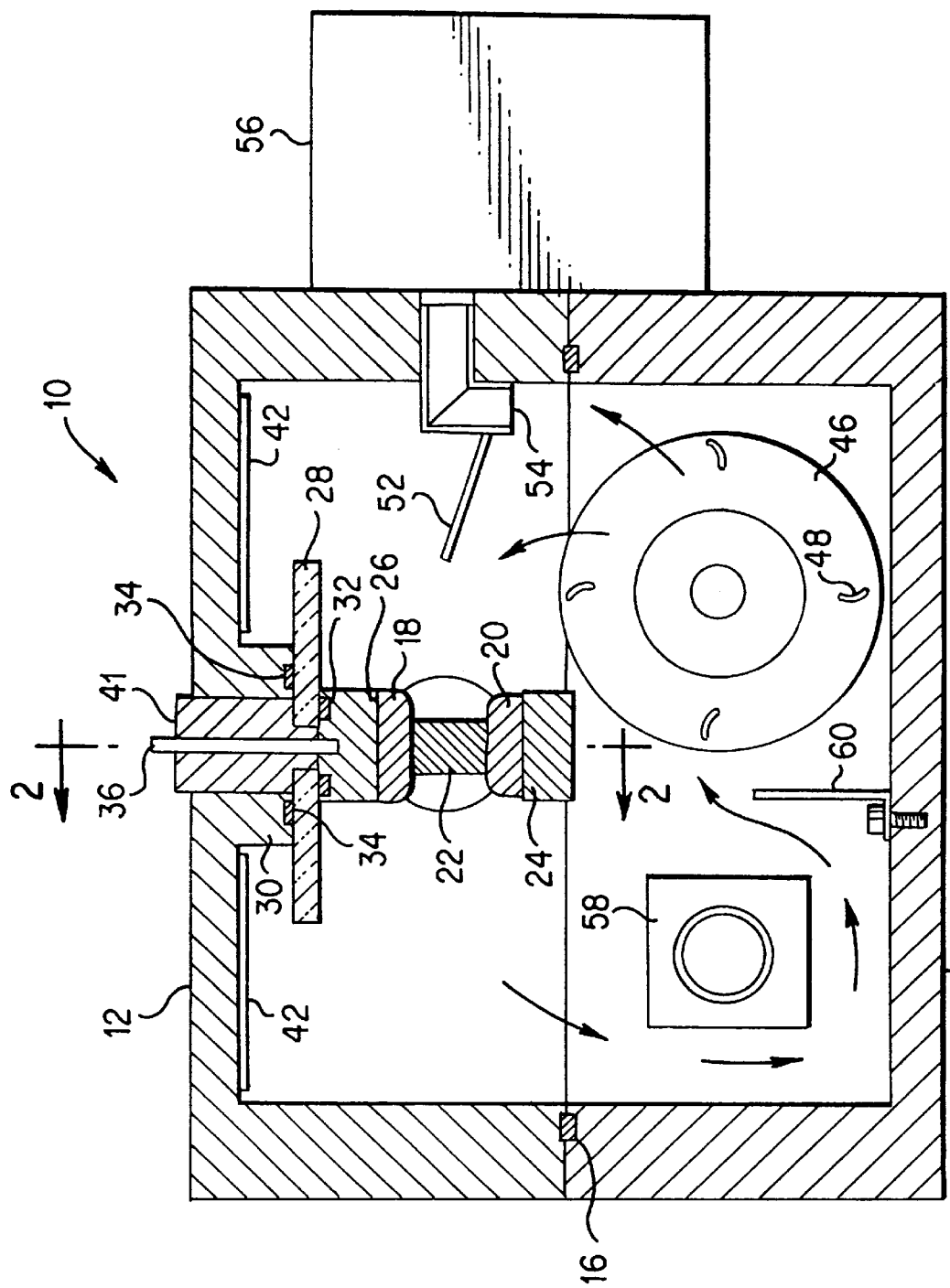
FIG. 1 is a cross-sectional view of an excimer laser cavity in accordance with one embodiment of the invention.
Figure 2:
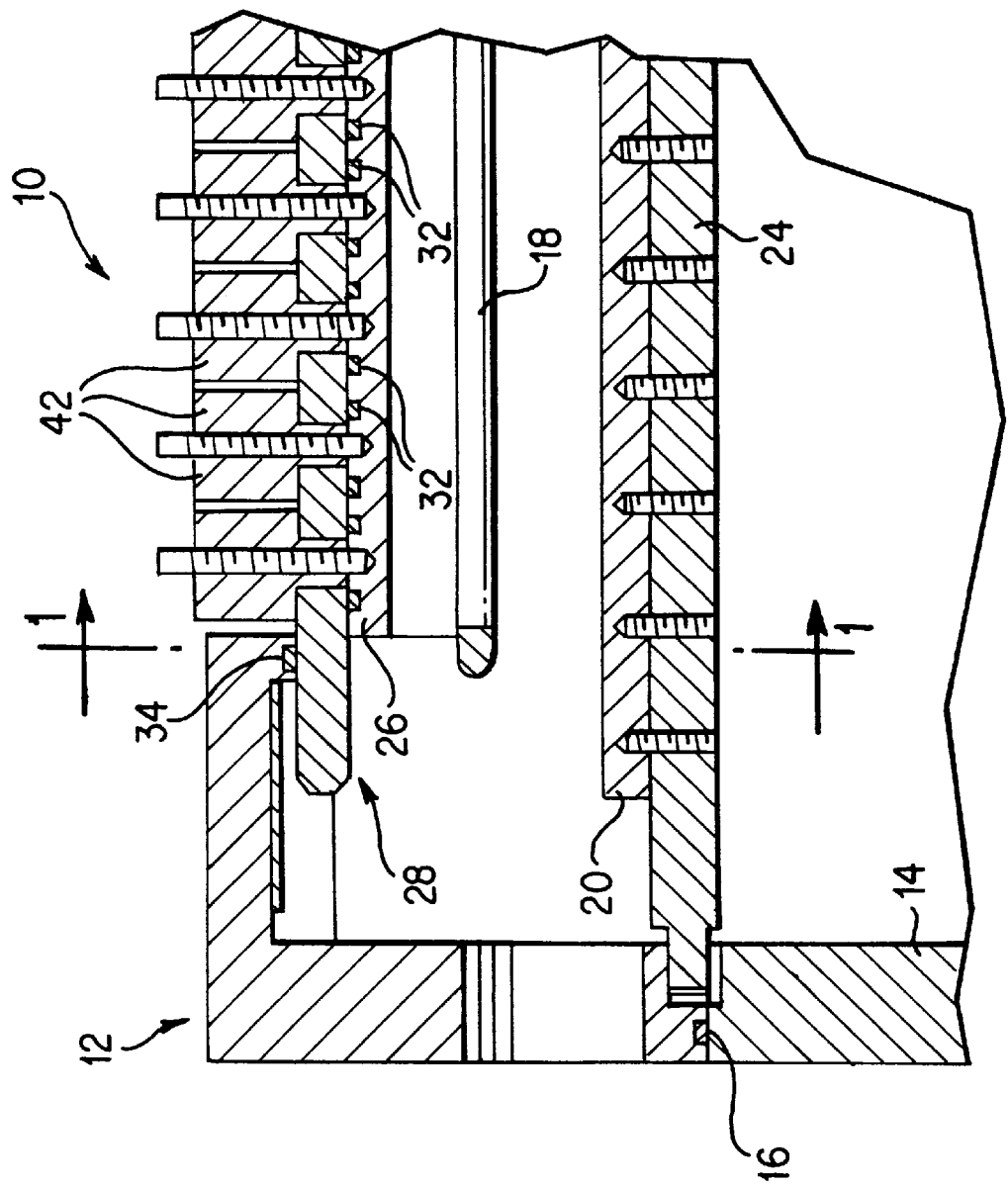
FIG. 2 is a top view of an excimer laser cavity.

FIGS. 1 and 2 show an excimer laser 10 according to U.S. Pat. No. 4,959,840 to Akins et al., assigned to the assignee of this invention and herein incorporated by reference in its entirety, but further including coated insulators in accordance with one embodiment of the present invention. FIG. 1 shows an end view of the excimer laser chamber 11 of excimer laser 10. FIG. 2 shows a view of the top half of excimer laser cavity 11. A housing of excimer laser 10 is formed by a pair of half-housing members 12 and 14 coupled together and sealed using an "O" ring seal 16 which extends around the perimeter of the housing.

A cathode 18 and an anode 20 are located within the housing and an electrical discharge area 22 is formed between cathode 18 and anode 20. High energy ultraviolet pulses generated by the firing of the laser are produced in electrical discharge area 22 when a high voltage (approximately 20 kilovolts) is impressed on cathode 18.

An extension for and support of anode 20 is provided by a base member 24. Spacer member 26 extends between cathode 18 and main insulator 28. Spacer member 26 provides for an electrical connection to cathode 18. Spacer member 26 also provides for a seal around a high voltage connection 36.

The upper housing member 12 includes downwardly extending wall portions 30 so that main insulator 28 is stood off from, or floating relative to, the upper wall and surrounding portions of the upper housing member 12. Space member 26 includes round recesses and "O" rings 32 located on one side of main insulator 28 and wall portions 30 includes recesses and "O" rings 34 on the opposite side of main insulator 28. The central portions of main insulator 28 is therefore compressively held between "O" rings 32 and 34.

The support structure thereby provides for the ceramic main insulator 28 to be supported at center positions in compression between the spacer 26 and wall portions 30 as sealed by "O" rings 32 and 34. This structural support is advantageous since the ceramic material of main insulator 28 is relatively strong in compression but relatively weak in bending. The remainder of main insulator 28 extends outwardly to provide for the proper insulation and is unsupported.

Ceramic main insulator 28 electrically insulates cathode 18 from the walls of the housing 12, thereby insuring that the proper electrical discharge takes place in discharge region 22. When high voltage is applied to the cathode 18, there is a tendency for undesirable currents to flow over the surface of main insulator 28 to the grounded housing half-member 12. How well the main insulator resists this current flow depends in part on the distance these currents have to flow (the farther the better), and on how close the surfaces of the main insulator are to the grounded housing walls 12 (again, the farther the better). Using a floating ceramic insulator 28 maximizes the distance parasitic currents must flow to reach the grounded half-member 12.

In addition to ceramic main insulators 28, ceramic plates 42 are applied to the upper wall 12 to extend across upper half-member 12 at least in the end positions of ceramic main insulator 28 to insure that the current path for the electrical current which is flowing along the surface of ceramic main insulators 28 cannot jump to upper wall 12.

In the laser shown in FIG. 1, a fan 46 having a multitude of fins 48 circulates the lasing gas within the cavity. Vane members 52 and 60 direct the flow of gas and gas scoop 54 siphons a portion of the gas into filter 56 for filtering.

According to the invention, ceramic main insulators 28 and ceramic plates 42 are coated with a coating insulator 43, in contrast to the embodiments in the '840 patent. As was discussed before, without a coating, contaminants from the ceramic material used in ceramic main insulators 28 or ceramic plates 42 may diffuse out of the material and detrimentally react with the laser gas. The reaction between the laser gas and the impurities degrades the laser gas and decreases the efficiency of the laser.

Figure 3:
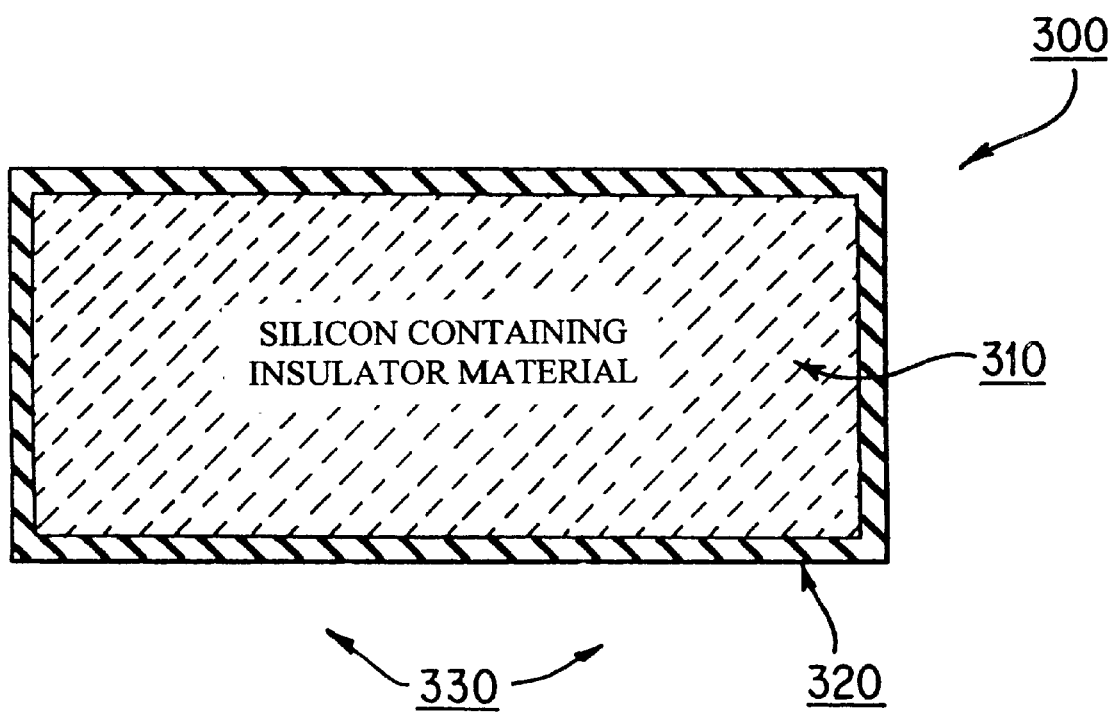
FIG. 3 is a cross-sectional view of a ceramic insulator coated with an insulating material.

FIG. 3 shows a coated ceramic insulator 300 used as any ceramic insulator in excimer laser 10. In FIG. 3, ceramic insulator 310 is coated with coating insulator 320. Ceramic insulator 310 may be formed from any ceramic insulation material with the appropriate dielectric and mechanical strength, but is preferably $Al_2O_3$ or an $Al_2O_3$-based ceramic. Other materials that may be used for ceramic insulator 310, with varying degrees of success, include $SiO_2$, $B_2O_3$, $Li_2O$, $GeO_2$, $As_2O_5$, $P_2O_5$, $Sb_2O_3$.

Coating insulator 320 may be any high purity insulating material that does not react with outside gas 330. Preferably, coating insulator 320 is $MgF_2$. Other materials that are candidates for coating insulator 320 may include oxide insulators such as $Al_2O_3$ and simple fluorides such as $CaF_2$ and $AlF_3$. The choice of coating insulator 320 primarily depends on outside gas 330, i.e. there should be no interactions between outside gas 330 and coating insulator 320, and certain materials may be inappropriate for use as coating insulator 320.

Coated ceramic insulator 300 is used (in a suitable form) in an excimer laser system as shown in FIGS. 1 and 2 where coated insulator 300 is surrounded by outside gas 330. In an excimer laser, gasses that are commonly used as outside gas 330 include lasing gasses XeCl, KrCl, ArF, KrF, and XeF.

A high-purity $MgF_2$ film on an $Al_2O_3$ ceramic insulator will shield the lasing gas from impurities in the $Al_2O_3$. Coating insulator 320 is chosen so as to be non-reactive to outside gas 320. In addition, coating insulator 320 must not reduce the insulating properties of the ceramic insulator in laser chamber 11. In particular, coating insulator 320 must withstand parasitic surface currents and the mechanical strain of being mounted as main insulator 28 or ceramic plates 42 within excimer laser 10 (FIGS. 1 and 2).

In the embodiment of FIG. 1, coated ceramic main insulator 28 is about 75 cm long, 10 to 15 cm wide, and about 2.5 cm thick. Other embodiments of this invention include coated ceramics having a large variety of shapes and sizes. Preferably, coating insulator 320 is between 10 and 100 nanometers thick. However, coatings of other thicknesses are possible.

Coating technologies and methods of coating ceramics with other materials are well known. Many of these technologies are explained in H. K. PULKER, THIN FILMS SCIENCE AND TECHNOLOGY, 6, COATINGS ON GLASS, 1984. Techniques for coating materials include chemical processes, chemical film formation, immersion dip-coating, spin coating, spray coating, chemical vapor deposition, evaporation, and sputtering. (See PULKAR) $MgF_2$ is most amenable to evaporation techniques because of the need not to dissociate the material during the coating process.

Figure 4:
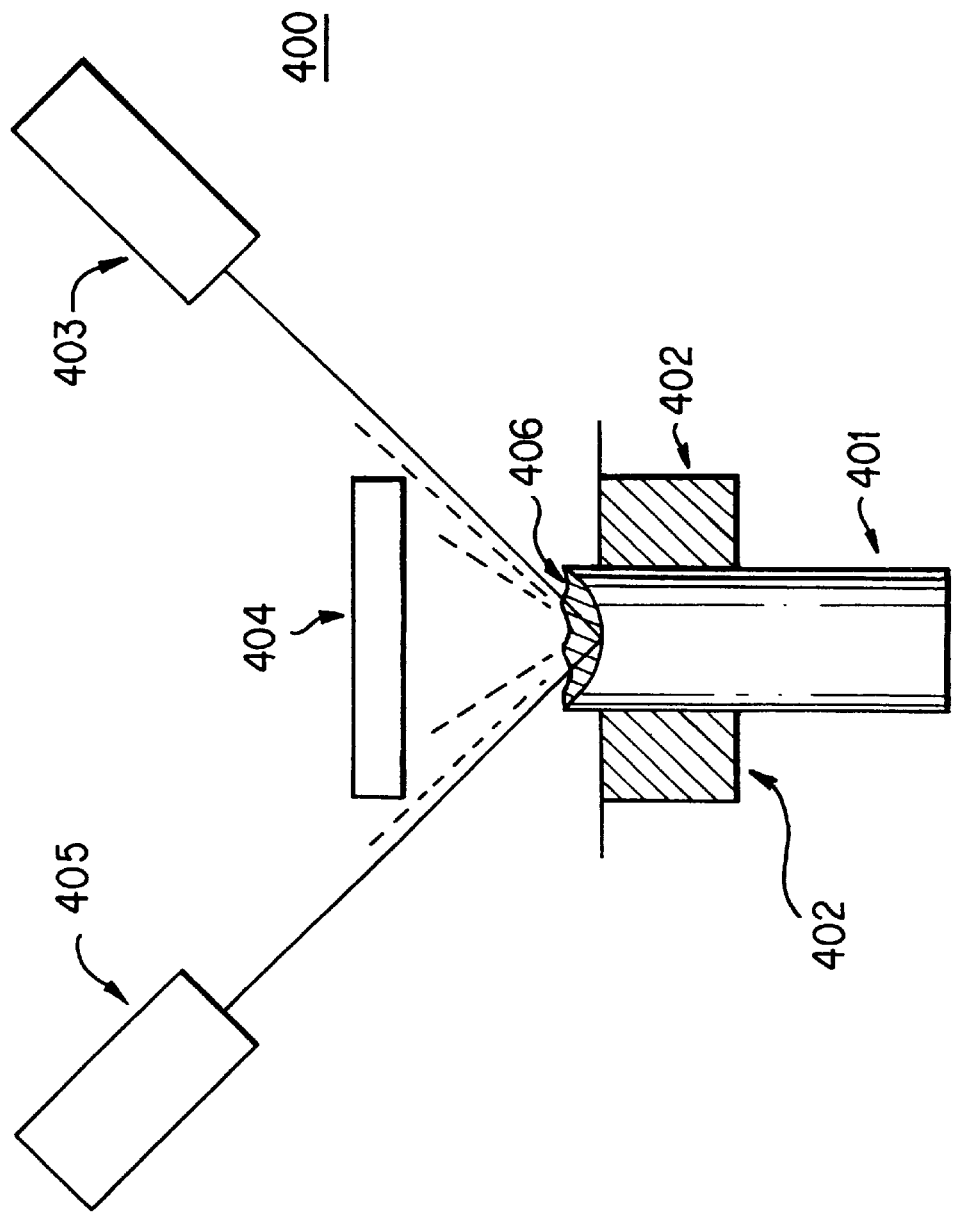
FIG. 4 is an evaporation apparatus for depositing insulating materials onto ceramics.

FIG. 4 shows a common evaporation system 400. The evaporator is enclosed in a high vacuum chamber (not shown). A stock rod of evaporation material 401 is held in brace 402. The top of the rod is heated to form a liquid bath 406. Heating the rod can be accomplished in many ways, including: electron beam heating by irradiating the top of the rod with a beam of electrons; laser heating by irradiating the top of the rod with laser beams; and mechanical heating by melting the rod in a crucible. In FIG. 4, the rod is shown heated by lasers 403 and 405.

Evaporation material 401 evaporates from the surface of liquid bath 406 and deposits on substrate 404. Substrate 404 is the ceramic insulator 310 to be coated. Prior to the evaporation process, the surfaces of substrate 404 are cleaned and mounted above evaporation material 401. Cleaning substrate 404 may be accomplished by many methods including cleaning with solvents, polishing with solvents, vapor degreasing, ultrasonic cleaning, spray cleaning, cleaning by heating and irradiation in vacuum, and cleaning by electrical discharge. The most common cleaning method is cleaning by electrical discharge where substrate 404 is placed between two discharging electrodes in the vacuum chamber just prior to the evaporation of evaporation material 401.

General considerations in depositing coating insulator 320 onto ceramic insulator 310 include uniform thickness of the coating and uniform coating coverage. In general, uniform thickness and coverage is accomplished by controlling the exposure of substrate 404 to bath 406. Heating of substrate 404 during evaporation assists the formation of coating insulator 320. In the preferred embodiment, the $Al_2O_3$ has a $MgF_2$ coating of between 50 and 100 nm thickness. Uniformity of the coating is not required but the coating does have to be thick enough to form a barrier between the fluorine lasing gas and silicon or other impurities in the $Al_2O_3$.

In addition to uniformity of thickness and coverage, coating insulator 320 should be as hard as possible to prevent chipping and flaking of coating insulator material into excimer laser 10 (FIGS. 1 and 2). Closely related to prevention of chipping and flaking are considerations of adhesion between coating insulator 320 and ceramic insulator 310. Adhesion is generally governed by the interactions between the materials of coating insulator 320 and ceramic insulator 310.

Typically, $MgF_2$ is deposited onto ceramic or glass substrates in evaporation chambers having pressures of between $10^{-5}$ and $10^{-8}$ millibar. A typical deposition rate is about 0.5–1 $\mu$m/min and typical substrate temperatures are between 25° C. and 300° C. Higher hardness is obtained with higher substrate temperatures. (See PULKAR, pgs. 374).

The above examples are demonstrative only. One skilled in the art may modify the above examples in ways that are within the scope of this invention. As such, this invention is limited only by the following claims.

We claim:

1. A laser system comprising;
    a laser chamber containing a laser gas and at least two electrodes;
    an insulator contaminated with silicon, said insulator also contained
    inside said laser chamber for insulating at least one of said electrodes; and an insulating coating disposed on the insulator, the insulating coating being substantially non-reactive with said laser gas;

wherein said silicon contaminating said insulator is trapped within said insulator by said insulating coating and prevented from reacting with said laser gas.

2. The system of claim 1, wherein the insulator is made from a ceramic.

3. The system of claim 2, wherein the insulating coating is of $MgF_2$.

4. The system of claim 2, wherein the ceramic is $Al_2O_3$.

5. The system of claim 4, wherein the insulating coating is $MgF_2$.

6. The system of claim 1, wherein the insulator is of a material chosen from the group consisting of $Al_2O_3$, $SiO_2$, $B_2O_3$, $Li_2O$, $GeO_2$, $As_2O_5$, $P_2O_5$, and $Sb_2O_3$.

7. The system of claim 6, wherein the insulating coating is of a material chosen from the group consisting of $Al_2O_3$, $TiO_2$, $MgF_2$, $CaF_2$, and $AlF_3$.

* * * * *